United States Patent
Liang et al.

(10) Patent No.: US 11,254,788 B2
(45) Date of Patent: Feb. 22, 2022

(54) MECHANICAL BALL-MILLING MTHOD FOR PREPARING A POLYDOPAMINE-MODIFIED MONTMORILLONITE NANOMATERIAL

(71) Applicant: Changsha University of Science & Technology, Hunan (CN)

(72) Inventors: Bo Liang, Hunan (CN); Kai Shi, Hunan (CN); Jianlong Zheng, Hunan (CN)

(73) Assignee: Changsha University of Science & Technology, Hunan (CN)

( * ) Notice: Subject to any disclaimer, the term of this patent is extended or adjusted under 35 U.S.C. 154(b) by 0 days.

(21) Appl. No.: 17/105,050

(22) Filed: Nov. 25, 2020

(65) Prior Publication Data

US 2021/0171713 A1   Jun. 10, 2021

(30) Foreign Application Priority Data

Dec. 5, 2019   (CN) .......................... 201911234604.1

(51) Int. Cl.
C08G 73/02 (2006.01)
C01B 33/40 (2006.01)
C08K 3/34 (2006.01)

(52) U.S. Cl.
CPC ............ C08G 73/026 (2013.01); C01B 33/40 (2013.01); C08K 3/346 (2013.01)

(58) Field of Classification Search
CPC .............................. C08K 3/346; C08G 73/026
See application file for complete search history.

(56) References Cited

U.S. PATENT DOCUMENTS 3,754,712 A * 8/1973 Cecil .................. B02C 23/06
241/16
2002/0003179 A1* 1/2002 Verhoff ................ B02C 17/161
241/21

(Continued)

FOREIGN PATENT DOCUMENTS

CN   110862092 B   3/2021

OTHER PUBLICATIONS

Xuan et al. (Colloids and Surfaces A: Physicochem. Eng. Aspects 422 (2013) 50-60 (Year: 2013).*

(Continued)

*Primary Examiner* — Liam J Heincer
(74) *Attorney, Agent, or Firm* — Parsons Behle & Latimer (57) ABSTRACT

A mechanical ball-milling method for preparing a polydopamine-modified montmorillonite nanomaterial is disclosed. The method includes dispersing a montmorillonite material in an aqueous solution, stirring, concentrating and collecting a concentrated montmorillonite solution for use; adding dopamine hydrochloride to a buffer solution to prepare a dopamine hydrochloride solution, with a concentration of 0.2-1 g/mL, and adjusting the pH value of the dopamine hydrochloride solution; and adding the dopamine hydrochloride solution and the concentrated montmorillonite solution simultaneously into a ball mill jar to form a mixture, and then subjecting the mixture to a ball milling for 0.3-6 hours, pouring the mixture out of the ball mill jar, and subjecting to a solid-liquid separation by a centrifugation, and then washing a solid product with deionized water for 3-6 times, and removing water from the solid product, to obtain the polydopamine-modified montmorillonite nanomaterial.

7 Claims, 7 Drawing Sheets

(56) References Cited

U.S. PATENT DOCUMENTS

| | | | |
|---|---|---|---|
| 2009/0048381 A1* | 2/2009 | Vignola | B82Y 30/00 524/445 |
| 2012/0003328 A1* | 1/2012 | Zheng | A61K 33/12 424/683 |
| 2017/0335163 A1* | 11/2017 | Jiang | C09K 8/12 |

OTHER PUBLICATIONS

Koo et al. (Polymer 44, 2003, 681-689) (Year: 2003).*
Haeshin Lee et al.; Supporting Online Material for Mussel-Inspired Surface Chemistry for Multifunctional Coatings www.sciencemag.org/cgi/content/full/318/5849/426/DC1 Oct. 19, 2007.
Haeshin Lee et al.; Mussel-Inspired Surface Chemistry; Reports;vol. 318 Science;www.sciencemag.org Oct. 19, 2007.
Ocean University of China; Synthesis of dopamine-modified multiwalled carbon nanotubes/chitosan composites and research on antifouling effect 2015.
Journal of Zhejiang Sci-Tech University (Natural Sciences); vol. 37, No. 5., Sep. 2019 Sep. 2017.
The State Intellectual Property Office of People's Republic of China; First Office Action for Application No. 201911234604.1 dated Dec. 25, 2020.
The State Intellectual Property Office of People's Republic of China; Notice to Grant Patent Rightfor Invention for Application No. 201911234604.1 dated Feb. 20, 2021.

* cited by examiner

MECHANICAL BALL-MILLING MTHOD FOR PREPARING A POLYDOPAMINE-MODIFIED MONTMORILLONITE NANOMATERIAL

CROSS REFERENCE TO RELATED APPLICATION

This disclosure claims the priority of Chinese Patent Application No. 201911234604.1, entitled "Mechanical ball-milling method for preparing a polydopamine-modified montmorillonite nanomaterial" filed with the China National Intellectual Property Administration on Dec. 5, 2019, which is incorporated herein by reference in its entirety.

TECHNICAL FIELD

The present disclosure relates to a technical field of modified nanomaterials, in particular to a mechanical ball-milling method for preparing a polydopamine-modified montmorillonite nanomaterial.

BACKGROUND

In the field of modern materials science research, in order to improve the application performance of materials, people often use surface modification methods to give new properties to the surface of materials. At present, the methods for surface modification of materials mainly include surface grafting, layer-by-layer self-assembly and plasma treatment, etc., to achieve multi-functionalization of the surface of materials. However, the adhesion performance between the modified material obtained by using the surface grafting method and the substrate is limited; for the layer-by-layer self-assembly, a lot of reagents are wasted during the experiment; for plasma treatment method, even though a significant effect could be obtained, the process is complicated, difficult to control, and the reaction is limited by the container, and it is particularly difficult to treat larger articles, and thus continuous production is difficult. Therefore, it is very necessary to find a simple, effective and low-polluting method to modify the surface of materials.

Mussel-like marine soft organisms themselves could be adhered extremely firmly to the surface of substrate materials such as metal, glass, polymers, minerals etc., by secreting a mucus with a super adhesion ability through their own byssus, and strong adhesion can be achieved even on the surface of tetrafluoroethylene, which is difficult to adhere (Lee H et al. Science, 2007, 318: 426-430). The super waterproof adhesion performance, universal adhesion performance and environmental protection performance of the adhesion obtained by secreting a mucus through byssus of marine mussel organisms has attracted great attention from the scientific community. Researchers have vigorously developed this effective surface modification technology, and used properties of polydopamine such as adhesion, hydrophilic properties and subsequent functionalization to implement secondary modifications on the modified substrate to perform surface functionalization, thereby obtaining a variety of materials with different functional properties respectively.

Montmorillonite is a kind of lamellar mineral constructed by stacking silicates having a nano-sized thickness and negatively charged surfaces, by electrostatic interaction between layers. The modified montmorillonite has a larger interlayer spacing, good dispersibility and strong interface effect, and when used for preparing montmorillonite/polymer nanocomposites, it could significantly improve mechanical properties of the nanocomposites. The organically modified montmorillonite was prepared by treating the montmorillonite with a solution method in which dopamine is used as the organic modifier for 20 hours. After treated with 1.0 g of dopamine for 10 hours, the interlayer spacing of the montmorillonite increased from 0.96 nm to 1.11 nm (Zhao Liangliang et al. *Journal of Zhejiang Sci-Tech University*, 2017 (5)). In order to realize the complementary or synergistic effect of carbon nanotubes and chitosan (Liu Dan. *Ocean University of China*, 2015), carbon nanotubes were modified with dopamine for 24 hours so that a large number of amino groups are formed on the surface of modified carbon nanotubes, resulting in that the modified carbon nanotubes had a better dispersibility and stability in aqueous solution. When dopamine dissolved in the liquid medium was subjected to the chemical reaction, the chemical and physical properties of the liquid medium have a greater impact on the modification, the reaction process took a long time, and the modification effect is greatly affected by time; therefore, in terms of the choice of solvent and experimental conditions, many considerations are needed. The use of a large amount of solvents will cause difficulties in the recovery of later waste materials, increased production costs, greater environmental pollution, and increased complexity of later sample processing and molding operations. Other disadvantages may also exist. Therefore, it is very necessary to develop a quick, simple, and environmentally friendly method for surface modification of nanomaterials.

SUMMARY

In view of the current situation that the existing solution modification method cannot produce multifunctional nano-montmorillonite materials in batches, and the shortcoming that deposition of dopamine is insufficient for the solution method, one object of the present disclosure is to provide a mechanical ball milling method for preparing a polydopamine-modified montmorillonite nanomaterial. The method increases the surface area of montmorillonite by the mechanical force of a ball mill, and uses dopamine to chemically modify the montmorillonite nanomaterials while physically modifying the montmorillonite, so that active functional groups are formed in the interlayer and on the surface of the montmorillonite, improving the surface activity of montmorillonite nanomaterials.

The present disclosure provides a mechanical ball-milling method for preparing a polydopamine-modified montmorillonite nanomaterial, comprising the following steps:

(1) dispersing a montmorillonite material in an aqueous solution, stirring, concentrating and collecting a concentrated montmorillonite solution for use;

(2) adding dopamine hydrochloride to a buffer solution to prepare a dopamine hydrochloride solution, with a concentration of 0.2-1 g/mL, and adjusting a pH value of the dopamine hydrochloride solution; and (3) adding the dopamine hydrochloride solution and the concentrated montmorillonite solution simultaneously into a ball mill jar to form a mixture, then subjecting the mixture to a ball-milling for 0.3-6 hours, pouring the mixture out of the ball mill jar, subjecting the mixture to a solid-liquid separation by a centrifugation, then washing a solid product with deionized water for 3-6 times, and removing water from the solid product, to obtain a polydopamine-modified montmorillonite nanomaterial.

In order to accelerate the self-polymerization of dopamine, an oxidant in a small amount is added to the dopamine hydrochloride solution. The oxidant includes any one of hydrogen peroxide, copper sulfate, ammonium sulfate, and sodium periodate. The amount of the oxidant is 6-20 wt %. In some embodiments, the oxidant is hydrogen peroxide and/or copper sulfate.

In some embodiments, in step (1), a solid/liquid ratio of montmorillonite to deionized water is 1:50-100 g/mL.

In some embodiments, in step (2), a mass ratio of dopamine hydrochloride to montmorillonite is 1:1-1:2, and the pH value of the dopamine hydrochloride solution is 8-9.

In some embodiments, in step (3), the ball-milling is carried out by using zirconia beads which include zirconia beads having a diameter of 2 mm, 5 mm, 10 mm and 15 mm, as grinding balls, with a mass ratio of grinding balls for each diameter of 4:8:20:5, a ball-to-material weight ratio of 10-50:1, and a rotation speed of 300-500 r/min.

In some embodiments, in step (3), water is removed from the solid product by a lyophilization, and before the lyophilization a dilute solution with a solid substance concentration of 5-25 wt % is prepared with the substance to be lyophilized, and the lyophilization is carried out at a temperature of −40° C. to −50° C. for 24-72 hours, to obtain the polydopamine-modified montmorillonite nanomaterial.

In some embodiments, in step (3), water is removed from the solid product by a vacuum drying until a constant weight of the product is achieved, and the resulting product is then subjected to another ball milling, to obtain the polydopamine-modified montmorillonite nanomaterial.

Further to that, the vacuum drying is carried out at a temperature of 80-100° C. for 6-12 hours.

Further to that, the ball milling is carried out for 15-30 min by using zirconia beads which include zirconia beads having a diameter of 5 mm, 10 mm, 15 mm and 20 mm, as grinding balls, with a mass ratio of grinding balls for each diameter of 3:8:20:8, a ball-to-material weight ratio of 10-50:1, and a rotation speed of 300-500 r/min.

In order to quickly modify the surface and interlayers of montmorillonite with dopamine, before modification, montmorillonite is firstly dispersed in water, so that water molecules can fully enter the interlayers of montmorillonite, and the adsorbed positive ions are transformed into hydrated ions; since a large number of hydration structures has sufficient strength to overcome the van der Waals force between layers of montmorillonite, the distance between the layers of montmorillonite is expanded, providing a favorable platform for the next chemical modification of dopamine.

In present disclosure, step (1), step (2) and step (3) can be performed sequentially in any order or at least partly in parallel.

Compared with the prior art, the present disclosure has the following beneficial technical effects:

(1) The present disclosure increases the surface area of montmorillonite by the mechanical force of the ball milling method to physically modify the montmorillonite material; meanwhile, during the ball milling, an oxidant in a small amount is added to make dopamine self-polymerize and modify quickly and uniformly the surface or interlayer of montmorillonite, to chemically modify montmorillonite (a large number of active functional groups are formed in the interlayers and on the surface of montmorillonite after the self-polymerization of dopamine) to further increase the interlayer spacing of montmorillonite materials. The two kinds of modification are carried out simultaneously to improve the modification efficiency, to obtain exfoliated functionalized polydopamine modified montmorillonite nanomaterials, and to expand the application scope of montmorillonite nanomaterials.

(2) Compared with the existing dopamine modification method (the solution method) having shortcomings such as longer modification time and modification effect greatly affected by time, the present disclosure performs physical modification of nanomaterials and chemical modification of nanomaterials with dopamine simultaneously, which shortens the preparation process and achieves a quick preparation of dopamine-modified nanomaterials. The modification effect is significant, with a good reproducibility. Moreover, the method is easy to operate, avoids the formation of a large amount of waste liquid, and is an environmentally friendly synthetic route, and thus it can be beneficial to large-scale continuous production.

(3) The method according to the present disclosure could be used to quickly prepare polydopamine-modified montmorillonite nanomaterials with good modification effect, and the mechanical ball milling method involved has a universal applicability for surface modification of nanomaterials.

DETAILED DESCRIPTION OF THE EMBODIMENTS

The technical solutions in the embodiments of the present disclosure are described clearly and completely below. Obviously, the described embodiments are only a part of the embodiments of the present disclosure, rather than all the embodiments.

Figure 1:
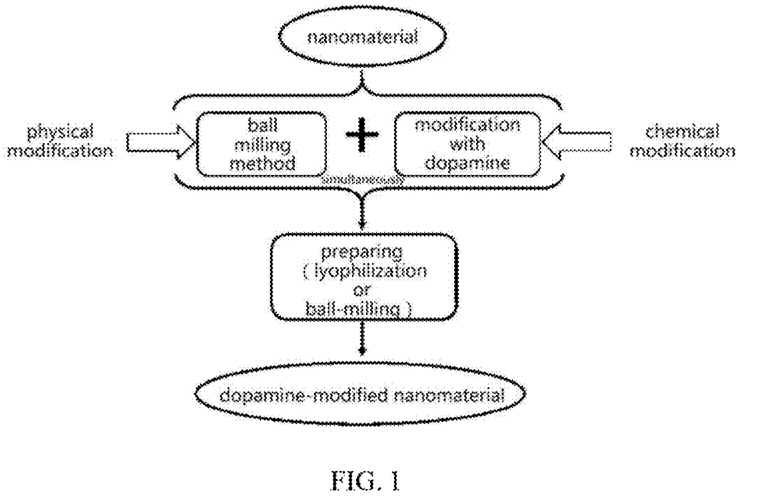
FIG. 1 shows a process flow diagram of the method according to the present disclosure.
Figure 10:
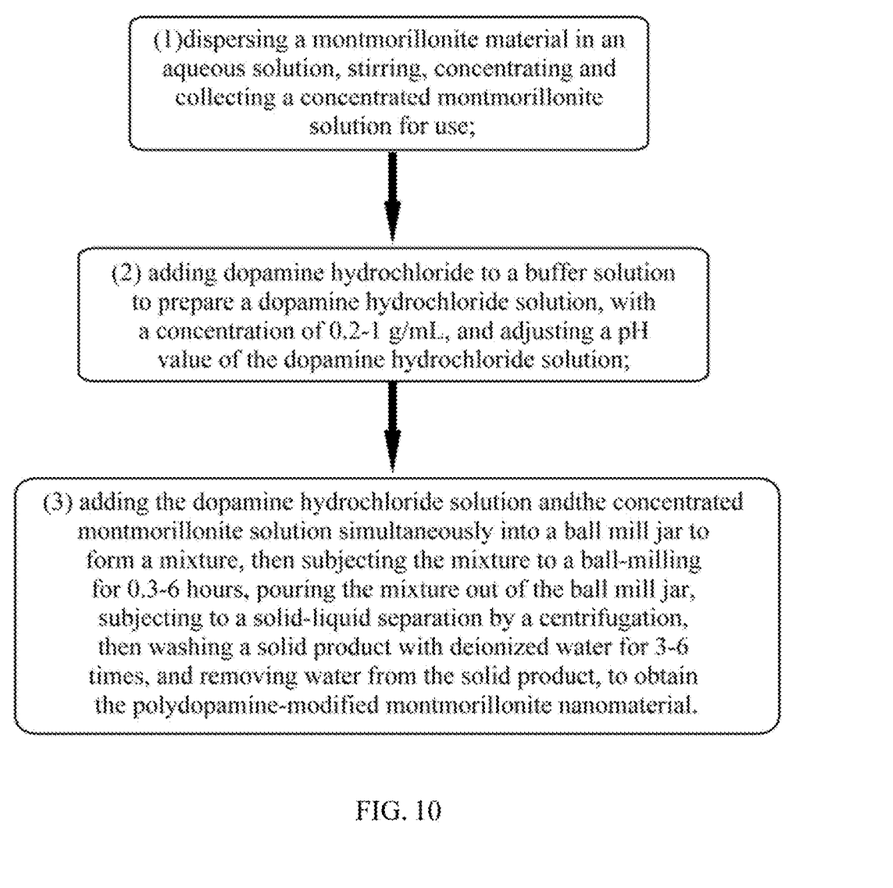

The present disclosure provides a mechanical ball-milling method for preparing a polydopamine-modified montmorillonite nanomaterial, as shown in FIG. 1 and FIG. 10, comprising the following steps:

(1) dispersing a montmorillonite material in an aqueous solution, stirring, concentrating and collecting a concentrated montmorillonite solution for use;

(2) adding dopamine hydrochloride to a buffer solution to prepare a dopamine hydrochloride solution, with a concentration of 0.2-1 g/mL, and adjusting a pH value of the dopamine hydrochloride solution; and (3) adding the dopamine hydrochloride solution and the concentrated montmorillonite solution simultaneously into a ball mill jar to form a mixture, then subjecting the mixture to a ball-milling for 0.3-6 hours, pouring the mixture out of the ball mill jar, subjecting to a solid-liquid separation by a centrifugation, then washing a solid product with deionized water for 3-6 times, and removing water from the solid product, to obtain a polydopamine-modified montmorillonite nanomaterial.

In step (1), a solid/liquid ratio of montmorillonite to deionized water is 1:50-100 g/mL.

In step (2), an oxidant in a small amount is added to the dopamine hydrochloride solution, wherein the oxidant includes any one of hydrogen peroxide, copper sulfate, ammonium sulfate, and sodium periodate, and the amount of the oxidant is 6-20 wt %. In some embodiments, the oxidant is hydrogen peroxide and/or copper sulfate.

In step (2), a mass ratio of dopamine hydrochloride to montmorillonite is 1:1-1:2, and the pH value of the dopamine hydrochloride solution is 8-9.

In step (3), the ball milling is carried out by using zirconia beads which include zirconia beads having a diameter of 2 mm, 5 mm, 10 mm and 15 mm as grinding balls, with a mass ratio of grinding balls for each diameter of 4:8:20:5, a ball-to-material weight ratio of 10-50:1, and a rotation speed of 300-500 r/min.

In step (3), water is removed from the solid product by a lyophilization, and before the lyophilization a dilute solution with a solid substance concentration of 5-25 wt % is prepared with the substance to be lyophilized, and the lyophilization is carried out at a temperature of −40° C. to −50° C. for 24-72 hours.

In step (3), water is removed from the solid product by a vacuum drying, and the resulting product is then subjected to another ball-milling, to obtain the polydopamine-modified montmorillonite nanomaterial.

Further to that, the vacuum drying is carried out at a temperature of 80-100° C. for 6-12 hours, until that the mass of the sample is constant.

Further to that, the another ball milling is carried out for 15-30 min by using zirconia beads which include zirconia beads having a diameter of 5 mm, 10 mm, 15 mm, and 20 mm, as grinding balls, with a mass ratio of grinding balls for each diameter of 3:8:20:8, a ball-to-material weight ratio of 10-50:1, and a rotation speed of 300-500 r/min.

The present disclosure will be further described below in reference with specific examples and drawings:

Examples 1

Ball Milling Method:

4 g of montmorillonite (MMT) was dispersed in 200 ml of aqueous solution, and they were stirred quickly, concentrated and a concentrated MMT solution was collected for use. 4 g of dopamine hydrochloride was added to a buffer solution to prepare a dopamine hydrochloride solution, and then 8 wt % hydrogen peroxide (oxidant) was added to the dopamine hydrochloride solution, and the pH value of the resulting solution was adjusted to 8-9. The resulting solution and the concentrated MMT solution were added simultaneously into a ball mill jar, and subjected to a ball-milling for 30 min, in which zirconia beads which include zirconia beads having a diameter of 2 mm, 5 mm, 10 mm and 15 mm, were used as grinding balls, with a mass ratio of grinding balls for each diameter of 4:8:20:5, a ball-to-material weight ratio of 30:1, and a rotation speed of 400 r/min. The solid product was separated by a ultrasonic centrifugation, then washed with deionized water, and lyophilized at a temperature of −40° C. to −50° C. for 48 hours, obtaining a polydopamine-modified MMT (Bal-MMT$_{30min}$).

Solution Method:

4 g of MMT was dispersed in 200 ml of aqueous solution, and they were stirred quickly to obtain an MMT suspension. 4 g of dopamine hydrochloride was added to a buffer solution to prepare the dopamine hydrochloride solution, and the pH value of the dopamine hydrochloride solution was adjusted to 8-9. The dopamine hydrochloride solution obtained was quickly added into the MMT suspension, and they were stirred with a high speed for 6 hours. The solid product was separated by a ultrasonic centrifugation, then washed with deionized water, and lyophilized at a temperature of −40° C. to −50° C. for 48 hours, obtaining a polydopamine-modified MMT (Sol-MMT$_{6h}$).

Figure 2A:
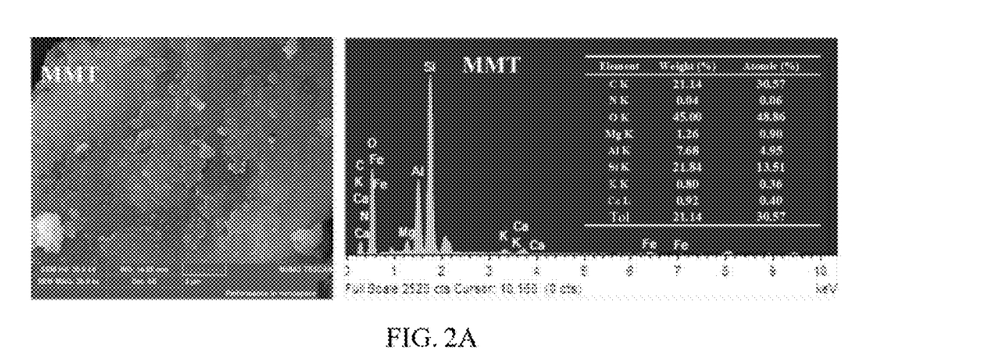
FIG. 2A shows a scanning electron microscope (SEM) image and an energy dispersive spectrometer (EDS) graph of the montmorillonite used in Example 1.
Figure 2B:
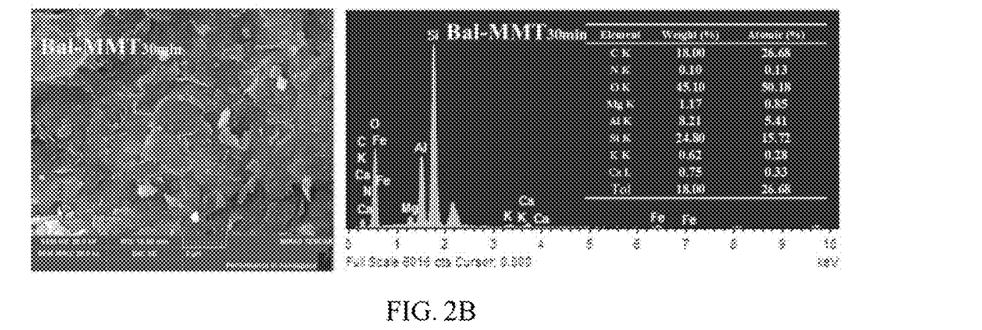
FIG. 2B shows a SEM image and an EDS graph of the polydopamine-modified montmorillonite prepared with a ball milling method modification for 30 min in Example 1.
Figure 2C:
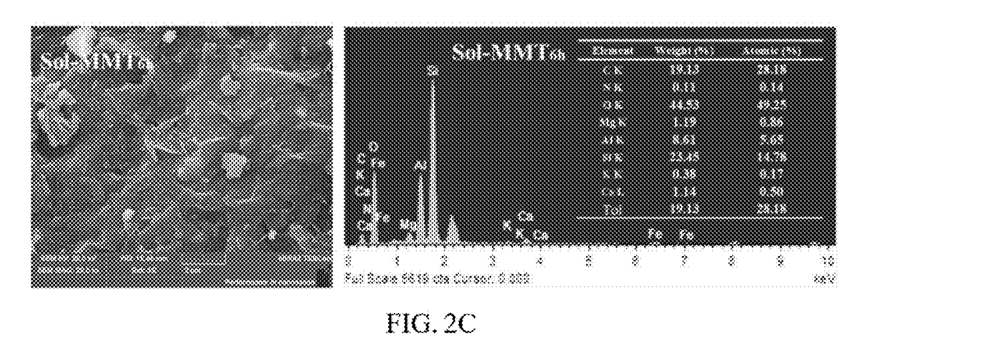
FIG. 2C shows a SEM image and an EDS graph of the polydopamine-modified montmorillonite prepared with a solution method modification for 6 hours in Example 1.

FIG. 2A shows a SEM image and an EDS graph of the montmorillonite used in Example 1; FIG. 2B shows a SEM image and an EDS graph of the polydopamine-modified montmorillonite prepared with a ball milling method modification for 30 min in Example 1; and FIG. 2C shows a SEM image and an EDS graph of the polydopamine-modified montmorillonite prepared with a solution method modification for 6 hours in Example 1. It can be seen from FIGS. 2A-2C that the surface of the MMT before modification was smoother and there was obvious agglomeration. After modification with dopamine, it can be seen from both of the SEM images of Bal-MMT$_{30min}$ and Sol-MMT$_{6h}$ that the MMT lamellas were expanded and in a curled state, indicating that dopamine can expand the MMT lamellas.

Figure 3:
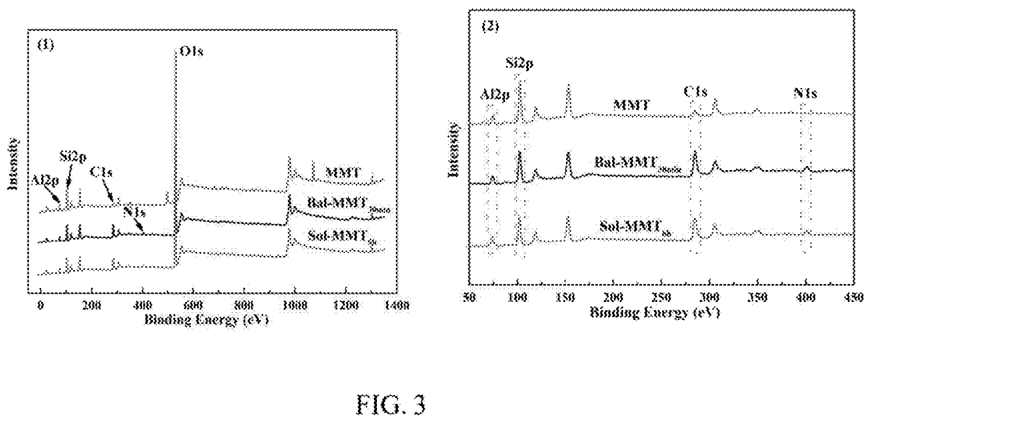
FIG. 3 shows X-ray photoelectron spectroscopy (XPS) graphs of montmorillonite used in Example 1 (labeled as MMT), the polydopamine-modified montmorillonite prepared with a ball milling method modification for 30 min in Example 1 (labeled as Bal-MMT$_{30min}$) and the polydopamine-modified montmorillonite prepared with a solution method modification for 6 hours in Example 1 (labeled as Sol-MMT$_{6h}$), in which, (2) is a partial enlarged view of the range of 50-450 eV in (1).

FIG. 3 shows XPS graphs of montmorillonite used in Example 1 (labeled as MMT), the polydopamine-modified montmorillonite prepared with a ball milling method modification for 30 min in Example 1 (labeled as Bal-MMT$_{30min}$) and the polydopamine-modified montmorillonite prepared with a solution method modification for 6 hours in Example 1 (labeled as Sol-MMT$_{6h}$), in which, (2) is a partial enlarged view of the range of 50-450 eV in (1). As shown in (1) and (2) of FIG. 3, characteristic Al2p and Si2p signals of MMT appears at 79.5 eV and 107.7 eV. After modification with dopamine, the electron peak intensity of Al2p and Si2p signals of MMT was weakened, due to the polydopamine layer on the surface of MMT. In the XPS graph of Bal-MMT$_{30min}$ and Sol-MMT$_{6h}$, characteristic Nis signal of dopamine appears at 406.7 eV. The result indicates that a polydopamine layer were formed on the surface of MMT after oxidation and self-polymerization of dopamine.

Figure 4:
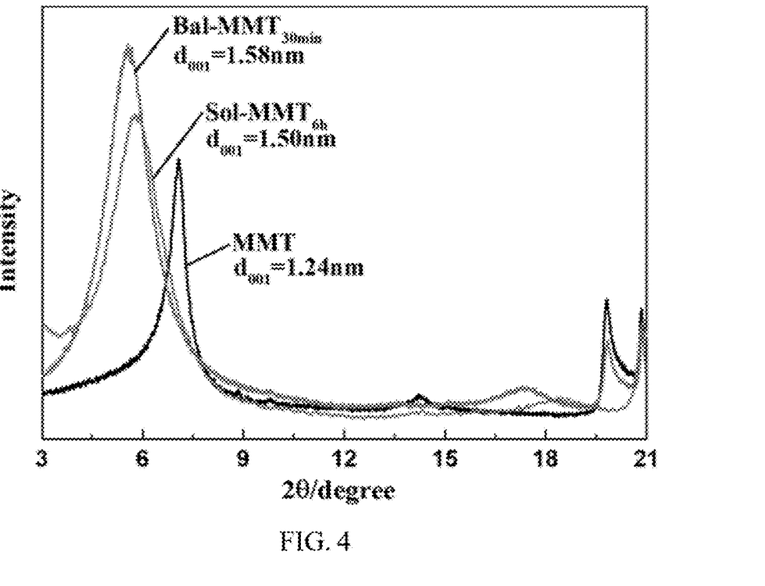
FIG. 4 shows a small-angle X-ray diffraction (XRD) pattern of the polydopamine-modified montmorillonite obtained in Example 1, with a ball milling method modification for 30 min and a solution method modification for 6 hours.
Figure 5:
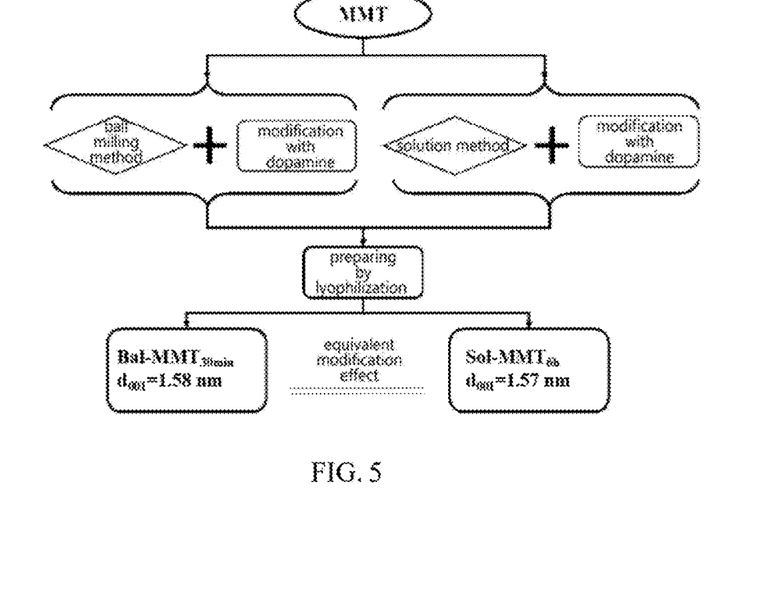
FIG. 5 shows a comparison diagram of the preparation process of the ball milling method and the solution method in Example 1.

FIG. 4 showed XRD diffraction patterns of Bal-MMT$_{30min}$ and Sol-MMT$_{6h}$ obtained in this example. It can be seen from the XRD patterns that the interlayer spacing $d_{001}$ corresponding to the diffraction peak of the crystal plane (001) of MMT was 1.24 nm. After being treated in this example, the diffraction peaks of the crystal plane (001) of Bal-MMT$_{30min}$ and Sol-MMT$_{6h}$ all moved to the small angle direction, and the interlayer spacing of Bal-MMT$_{30min}$ was expanded to $d_{001}$=1.58 nm, and the interlayer spacing of Sol-MMT$_{6h}$ was expanded to $d_{001}$=1.57 nm. The result indicated that this example could not only expand the interlayer spacing of MMT, but also achieve the interlayer expansion effect of the solution method for 6 hours, which was consistent with the result in FIG. 2. The preparation process was shown in FIG. 5, which shows a comparison diagram of the preparation process of the ball milling method and the solution method in Example 1.

Example 2

4 g of MMT was dispersed in 200 ml of aqueous solution, and they were stirred quickly, concentrated and a concentrated MMT solution was collected for use. 4 g of dopamine hydrochloride was added to a buffer solution to prepare a dopamine hydrochloride solution, and 8 wt % hydrogen peroxide was added to the dopamine hydrochloride solution, and the pH value of the resulting solution was adjusted to 8-9. The resulting solution and the concentrated MMT solution were added simultaneously to a ball mill jar, and subjected to a ball-milling for 60 min, in which zirconia beads which include zirconia beads having a diameter of 2 mm, 5 mm, 10 mm and 15 mm, were used as grinding balls, with a mass ratio of grinding balls for each diameter of 4:8:20:5, a ball-to-material weight ratio of 20:1, and a rotation speed of 400 r/min. The solid product was separated by a ultrasonic centrifugation, then washed with deionized water, and lyophilized at a temperature of −40° C. to −50° C. for 48 hours, obtaining a polydopamine-modified MMT (Bal-MMT$_{60min}$).

Figure 6:
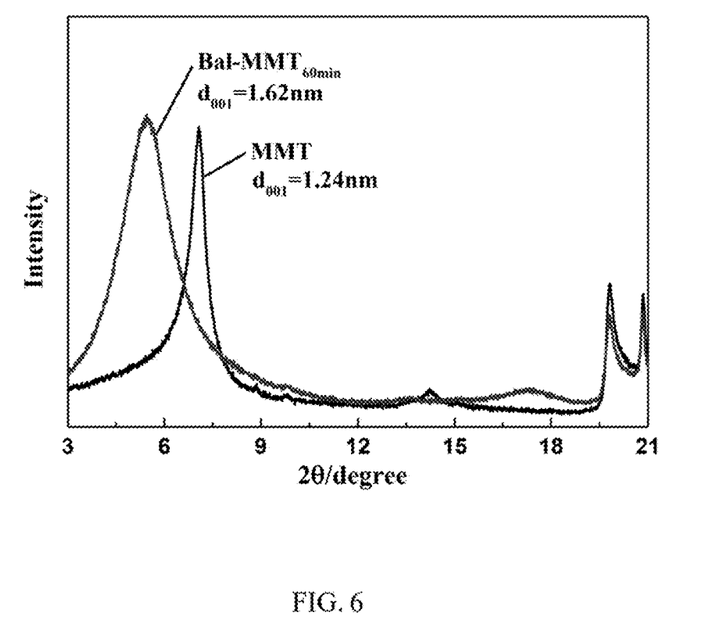
FIG. 6 shows a small angle X-ray diffraction (XRD) pattern of the polydopamine-modified montmorillonite obtained in Example 2, with a ball milling method modification for 60 min and a lyophilization.

FIG. 6 shows the XRD diffraction pattern of Bal-MMT$_{60min}$ obtained in this example. It can be seen from the XRD pattern that the interlayer spacing $d_{001}$ corresponding to the diffraction peak of the crystal plane (001) of MMT was 1.24 nm. After being treated in this example, the diffraction peak of the crystal plane (001) of Bal-MMT$_{60min}$ obviously moved to a small angle direction, and the interlayer spacing was expanded to $d_{001}$=1.62 nm, indicating that this example can expand the interlayer spacing of MMT.

Example 3

4 g of MMT was added in 200 ml of aqueous solution, and they were stirred quickly, concentrated and a concentrated MMT solution was collected for use. 4 g of dopamine hydrochloride was added to a buffer solution to prepare a dopamine hydrochloride solution, and 8 wt % hydrogen peroxide was added to the dopamine hydrochloride solution, and the pH value of the resulting solution was adjusted to 8-9. The resulting solution and the concentrated MMT solution were added simultaneously to a ball mill jar, and subjected to a ball-milling for 90 min, in which zirconia beads which include zirconia beads having a diameter of 2 mm, 5 mm, 10 mm and 15 mm, were used as grinding balls, with a mass ratio of grinding balls for each diameter of 4:8:20:5, a ball-to-material weight ratio of 20:1, and a rotation speed of 400 r/min. The solid product was separated by a ultrasonic centrifugation, then washed with deionized water, and lyophilized at a temperature of −40° C. to −50° C. for 48 hours, obtaining a polydopamine-modified MMT (Bal-MMT$_{90min}$).

Figure 7:
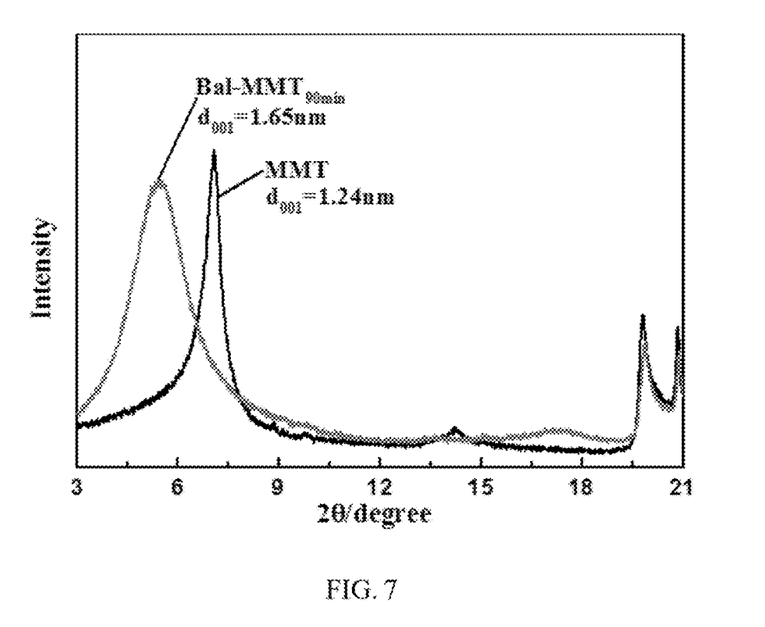
FIG. 7 shows a small-angle X-ray diffraction (XRD) pattern of the polydopamine-modified montmorillonite obtained in Example 3, with a ball milling method modification for 90 min and a lyophilization.

FIG. 7 shows the XRD diffraction pattern of Bal-MMT$_{90min}$ obtained in this example. It can be seen from the XRD pattern that the interlayer spacing $d_{001}$ corresponding to the diffraction peak of the crystal plane (001) of MMT was 1.24 nm. After being treated in this example, the diffraction peak of the crystal plane (001) of Bal-MMT$_{90min}$ obviously moved to a small angle direction, and the interlayer spacing was expanded to $d_{001}$=1.65 nm, indicating that this example can expand the interlayer spacing of MMT.

Example 4

4 g of MMT was dispersed in 200 ml of aqueous solution, and they were stirred quickly, concentrated and a concentrated MMT solution was collected for use. 4 g of dopamine hydrochloride was added to a buffer solution to prepare a dopamine hydrochloride solution, and 8 wt % hydrogen peroxide was added to the dopamine hydrochloride solution, and the pH value of the resulting solution was adjusted to 8-9. The resulting solution and the concentrated MMT solution were added simultaneously to a ball mill jar, and subjected to a ball-milling for 30 min, in which zirconia beads which include zirconia beads having a diameter of 2 mm, 5 mm, 10 mm and 15 mm, were used as grinding balls, with a mass ratio of grinding balls for each diameter of 4:8:20:5, a ball-to-material weight ratio of 10:1-50:1, and a rotation speed of 400 r/min. The solid product was separated by a ultrasonic centrifugation, then washed with deionized water, and vacuum dried at a temperature of 80° C. for 7 h, until the mass of the sample was constant. The resulting product was then subjected to another ball-milling for 20 min, in which zirconia beads which include zirconia beads having a diameter of 5 mm, 10 mm, 15 mm and 20 mm, were used as grinding balls, with a mass ratio of grinding balls for each diameter of 3:8:20:8, a ball-to-material weight ratio of 20:1, and a rotation speed of 400 r/min, obtaining a polydopamine-modified MMT (Bal$_2$-MMT$_{30min}$).

Figure 8:
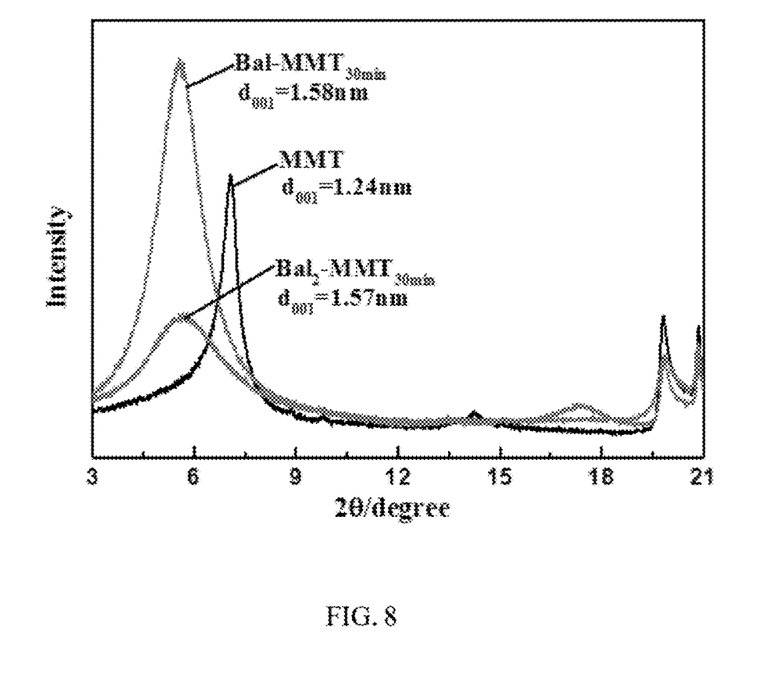
FIG. 8 shows a small angle X-ray diffraction (XRD) pattern of the polydopamine-modified montmorillonites obtained in Example 4, with a milling method modification for 30 min and another milling method modification for 20 min, and obtained in Example 1, with a ball milling method modification for 30 min and a lyophilization.
Figure 9:
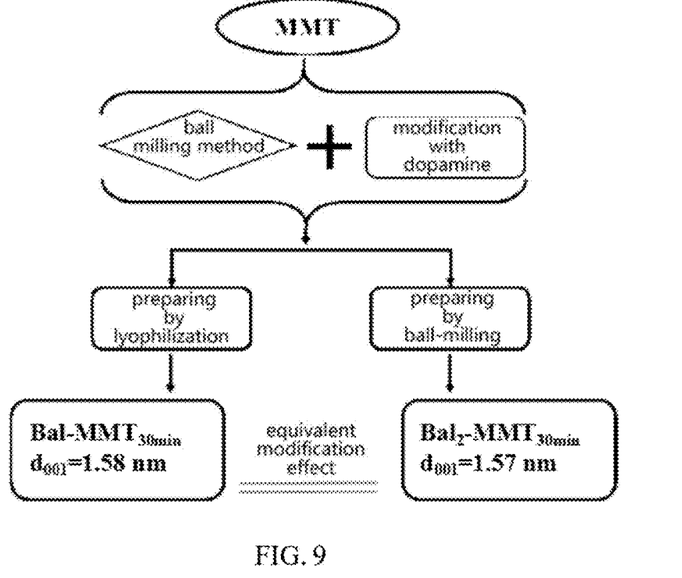
FIG. 9 shows a comparison diagram of the preparation process of the ball milling method and the solution method in Example 4 and FIG. 10 is a flow chart of an embodiment of a method according to the present disclosure.

FIG. 8 shows the XRD diffraction pattern of Bal$_2$-MMT$_{30min}$ obtained in this example. It can be seen from the XRD pattern that the interlayer spacing $d_{001}$ corresponding to the diffraction peak of the crystal plane (001) of MMT was 1.24 nm. After being treated in this example, the diffraction peak of the crystal plane (001) of Bal$_2$-MMT$_{30min}$ obviously moved to the small angle direction, and the interlayer spacing was expanded to $d_{001}$=1.57 nm, indicating that this example can expand the interlayer spacing of MMT. Compared with the Bal-MMT$_{30min}$ in Example 1, the layer expansion effect of Bal$_2$-MMT$_{30min}$ was equivalent to that of Bal-MMT$_{30min}$. The preparation process was shown in FIG. 9, which shows a comparison diagram of the preparation process of the ball milling method and the solution method in Example 4.

The above are only preferred embodiments of the present disclosure, and the protection scope of the present disclosure is not limited to the above-mentioned examples. For those skilled in the art, improvements and variations obtained without departing from the technical concept of the present disclosure should also be regarded as the protection scope of the present disclosure.

What is claimed is:

1. A mechanical ball-milling method for preparing a polydopamine-modified montmorillonite nanomaterial, comprising:
dispersing a montmorillonite material in an aqueous solution, stirring, concentrating, and collecting a concentrated montmorillonite solution for use;
adding dopamine hydrochloride to a buffer solution to prepare a dopamine hydrochloride solution, with a concentration of 0.2-1 g/L, and adjusting a pH value of the dopamine hydrochloride solution, wherein hydrogen peroxide is added to the dopamine hydrochloride solution in an amount of 6-20 wt %; and
adding the dopamine hydrochloride solution and the concentrated montmorillonite solution simultaneously into a ball mill jar to form a mixture, then subjecting the mixture to a ball milling for 0.3-6 hours, pouring the mixture out of the ball mill jar, subjecting the mixture to a solid-liquid separation by a centrifugation, then washing a solid product with deionized water for 3-6 times, and removing water from the solid product, to obtain a polydopamine-modified montmorillonite nanomaterial, wherein the ball milling is carried out using zirconia beads having diameters of 2 mm, 5 mm, 10 mm, and 15 mm as grinding balls, wherein a mass ratio for each diameter of the zirconia beads among the grinding balls is 4:8:20:5, respectively, wherein a mass ratio of grinding balls to material is between 10:1 and 50:1, and wherein the ball milling is carried out with a rotation speed of 300-500 r/min.

2. The mechanical ball-milling method for preparing a polydopamine-modified montmorillonite nanomaterial of claim 1, wherein dispersing the montmorillonite material in the aqueous solution, stirring, concentrating, and collecting the concentrated montmorillonite solution for use further comprises using a solid/liquid ratio of montmorillonite to deionized water is 1:50-100 g/mL.

3. The mechanical ball-milling method for preparing a polydopamine-modified montmorillonite nanomaterial of claim 1, wherein during the addition of the dopamine hydrochloride solution and the concentrated montmorillonite solution simultaneously into the ball mill jar to form the mixture, the pH value of the dopamine hydrochloride solution is 8-9.

4. The mechanical ball-milling method for preparing a polydopamine-modified montmorillonite nanomaterial of claim 1, wherein subjecting the mixture to a ball milling for 0.3-6 hours further comprises removing water from the solid product by a lyophilization, and wherein before the lyophilization a dilute solution with a solid substance concentration of 5-25 wt % is prepared with a substance to be lyophilized, and the lyophilization is carried out at a temperature of 40° C. to 50° C. for 24-72 hours.

5. The mechanical ball-milling method for preparing a polydopamine-modified montmorillonite nanomaterial of claim 1, wherein subjecting the mixture to a ball milling for 0.3-6 hours further comprises removing water from the solid product by a vacuum drying until a constant weight of the product is achieved, and a resulting product is subjected to another ball milling, to obtain the polydopamine-modified montmorillonite nanomaterial.

6. The mechanical ball-milling method for preparing a polydopamine-modified montmorillonite nanomaterial of claim 5, wherein the vacuum drying is carried out at a temperature of 80-100° C. for 6-12 hours.

7. The mechanical ball-milling method for preparing a polydopamine-modified montmorillonite nanomaterial of claim 5, wherein another ball milling is carried out for 15-30 mins. by using additional zirconia beads having diameters of 5 mm, 10 mm, 15 mm and 20 mm as grinding balls, with a mass ratio of grinding balls for each diameter of 3:8:20:8, a ball-to-material weight ratio of 10-50:1, and a rotation speed of 300-500 r/min.

* * * * *

UNITED STATES PATENT AND TRADEMARK OFFICE
CERTIFICATE OF CORRECTION

Page 1 of 1

| | |
|---|---|
| PATENT NO. | : 11,254,788 B2 |
| APPLICATION NO. | : 17/105050 |
| DATED | : February 22, 2022 |
| INVENTOR(S) | : Liang et al. |

It is certified that error appears in the above-identified patent and that said Letters Patent is hereby corrected as shown below:

On the Title Page

Item (54) and in the Specification Column 1, Line 1, should read as follows:
MECHANICAL BALL-MILLING METHOD FOR PREPARING A POLYDOPAMINE-MODIFIED MONTMORILLONITE NANOMATERIAL Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*